United States Patent [19]
Spannbauer

[11] Patent Number: 6,092,499
[45] Date of Patent: Jul. 25, 2000

[54] INTAKE PIPE

[75] Inventor: Helmut Spannbauer, Ludwigsburg, Germany

[73] Assignee: Filterwerk Mann & Hummel GmbH, Ludwigsburg, Germany

[21] Appl. No.: 09/051,742

[22] PCT Filed: Jul. 4, 1996

[86] PCT No.: PCT/EP96/02946

§ 371 Date: Oct. 22, 1998

§ 102(e) Date: Oct. 22, 1998

[87] PCT Pub. No.: WO97/15755

PCT Pub. Date: May 1, 1997

[30] Foreign Application Priority Data

Oct. 20, 1995 [DE] Germany .............. 195 39 078

[51] Int. Cl.[7] .................................................. F02M 35/10
[52] U.S. Cl. .............................. 123/184.61; 123/184.53; 123/184.57
[58] Field of Search ............... 123/184.21, 184.61, 123/184.24, 184.34, 184.42, 184.47, 184.53, 184.57; 181/229, 240

[56] References Cited

U.S. PATENT DOCUMENTS

| | | | |
|---|---|---|---|
| 4,111,163 | 9/1978 | Ederer et al. | 123/184.21 |
| 4,738,229 | 4/1988 | Wada et al. | 123/184.55 |
| 4,803,961 | 2/1989 | Hiraoka et al. | 123/184.36 |
| 4,803,962 | 2/1989 | Asai | 123/184.48 |
| 5,259,356 | 11/1993 | Karlsson et al. | 123/541 |
| 5,542,711 | 8/1996 | Vaudry | 285/41 |
| 5,575,249 | 11/1996 | Mielke et al. | 123/184.57 |
| 5,636,605 | 6/1997 | Nomizo et al. | 123/184.61 |
| 5,642,697 | 7/1997 | Jahrens et al. | 123/184.21 |
| 5,653,200 | 8/1997 | Hafner et al. | 123/184.21 |
| 5,704,326 | 1/1998 | Minegishi et al. | 123/184.53 |

*Primary Examiner*—Noah P. Kamen
*Assistant Examiner*—Hai Huynh
*Attorney, Agent, or Firm*—Evenson, McKeown, Edwards & Lenahan, P.L.L.C.

[57] ABSTRACT

An intake manifold for an internal combustion engine in which the intake manifold includes at least one flange for attachment to the engine, at least two intake tube elements, and a manifold chamber communicating with the intake tube elements, the manifold chamber being subdivided by a separator or dividing element into at least two communicating compartments.

15 Claims, 7 Drawing Sheets

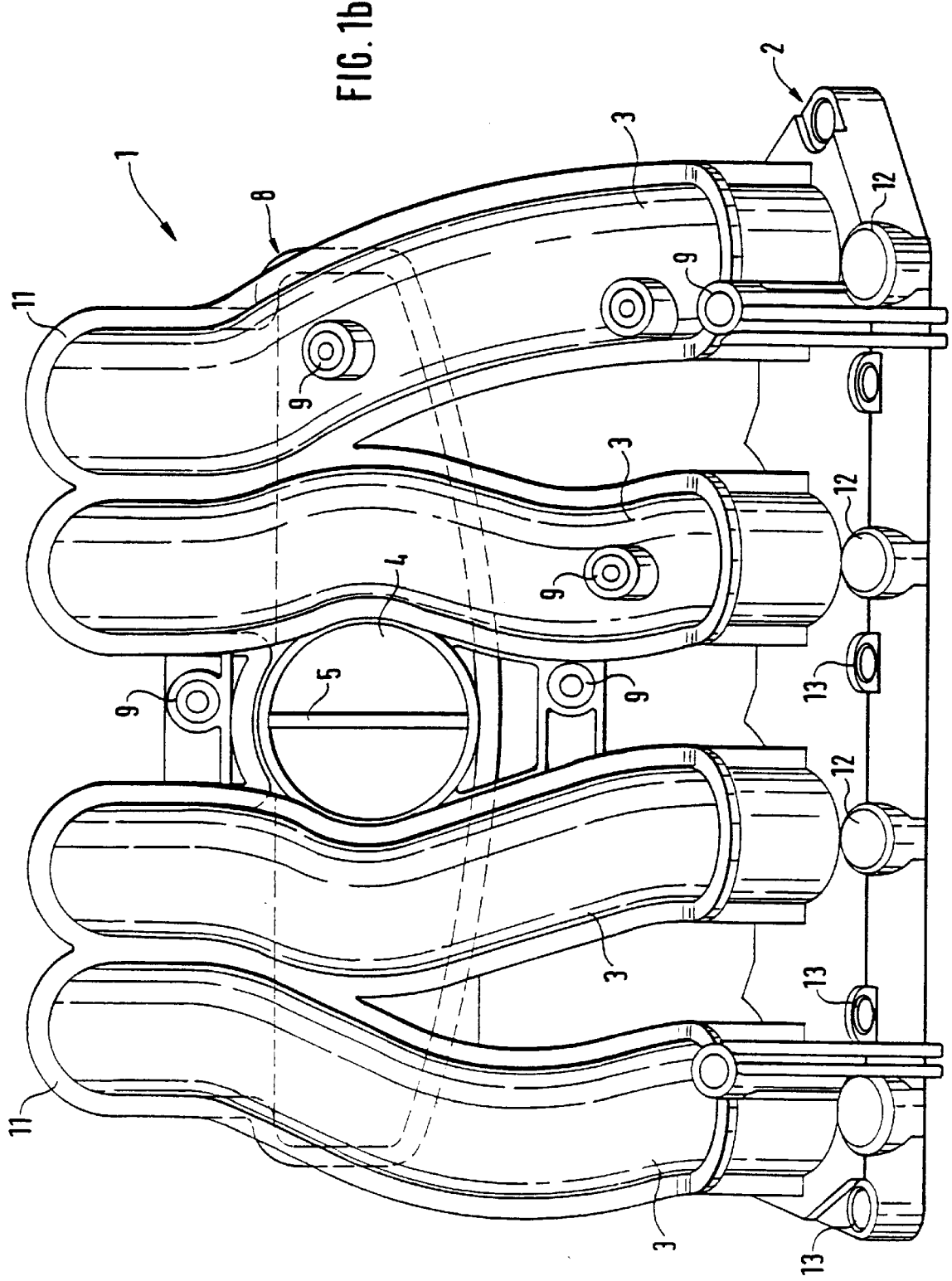

INTAKE PIPE

BACKGROUND OF THE INVENTION

The invention relates to an air intake manifold for an internal combustion engine, wherein the intake manifold comprises at least one flange at the engine end, at least two tube elements, as well as a manifold chamber communicating with the tube elements.

Such intake manifolds are known, for example, in use in passenger automobiles.

If it is desired to use such intake manifolds in motor vehicles which must satisfy strict noise emission requirements, it is a disadvantage that the tubes produce undesirable noise in various states of operation.

It might be possible to fully enclose an engine compartment or cover areas which produce intense noise with insulating material. This, however, is expensive to manufacture and would therefore increase the cost of the entire vehicle. Furthermore, it would increase weight, which automatically would result in an increase in fuel consumption.

SUMMARY OF THE INVENTION

It is thus the object of the invention to improve an air intake manifold of the kind described above so as to make it lightweight, inexpensive and quiet.

In accordance with the invention this object is achieved by dividing the manifold chamber of the intake manifold with a dividing element into at least two communicating compartments.

Due to the presence of the dividing element the formation of vibratory modes is impeded or suppressed.

An advantageous embodiment of the invention provides for the intake manifold to be composed of synthetic resin material. The use of synthetic resin material makes the intake manifold lighter in weight, thereby lowering fuel consumption.

Furthermore, provision can advantageously be made for the intake manifold to be manufactured by the half-shell technique. This manufacturing technique offers cost advantages with simple shapes.

In another advantageous embodiment of the invention the dividing element covers substantially 100% of the manifold chamber cross section. Since the dividing element divides the chamber substantially into two parts, the development of modes of vibration is wholly or partially suppressed.

In an advantageous embodiment of the invention, the dividing element covers 25 to 75% of the manifold chamber cross section. Even a partial cross-sectional reduction suffices to break up the propagation of vibration modes, so that this variant results in an additional weight reduction, while the air, as a vibrating mass, interacts through the cross-sectional reduction against a volume of air behind it that acts as a damper. Furthermore, it is important to see to it that the linear dimensions are small in proportion to the wavelength, which prevents scattering in the vicinity of the cross-sectional reduction. It is also advantageous to make the marginal clamping of the dividing elements resiliently mounted. Advantageously, the dividing element is composed wholly or partially of porous material.

Advantageously, the distance from the dividing element to the manifold chamber's inner wall is not evenly divisible by the wavelengths which occur in the primary operating state or a multiple thereof. This prevents the occurrence of standing waves.

In an advantageous embodiment of the invention, the distance from the dividing element to the inner wall of the manifold chamber is adjustable. By appropriate selection of the geometry, or appropriate adaptation of the geometry to the prevailing operating conditions, for example by means of displaceable intermediate walls moved by means of electrical systems or by vacuum-supported elements, the occurrence of standing waves is prevented, since they form whenever a wave after, for example, two reflections comes back to the starting point with the same phasing.

These and other features of preferred embodiments of the invention are found not only in the claims but also in the description and the drawings, the individual features can be utilized individually or severally in the form of sub-combinations in the embodiments of the invention and in other fields, and may constitute advantageous as well as independently patentable embodiments for which protection is hereby claimed.

BRIEF DESCRIPTION OF THE DRAWINGS

FIGS. 1a and 1b show the division of the manifold chamber by a dividing element.

DETAILED DESCRIPTION OF PREFERRED EMBODIMENTS

Figure 1A:
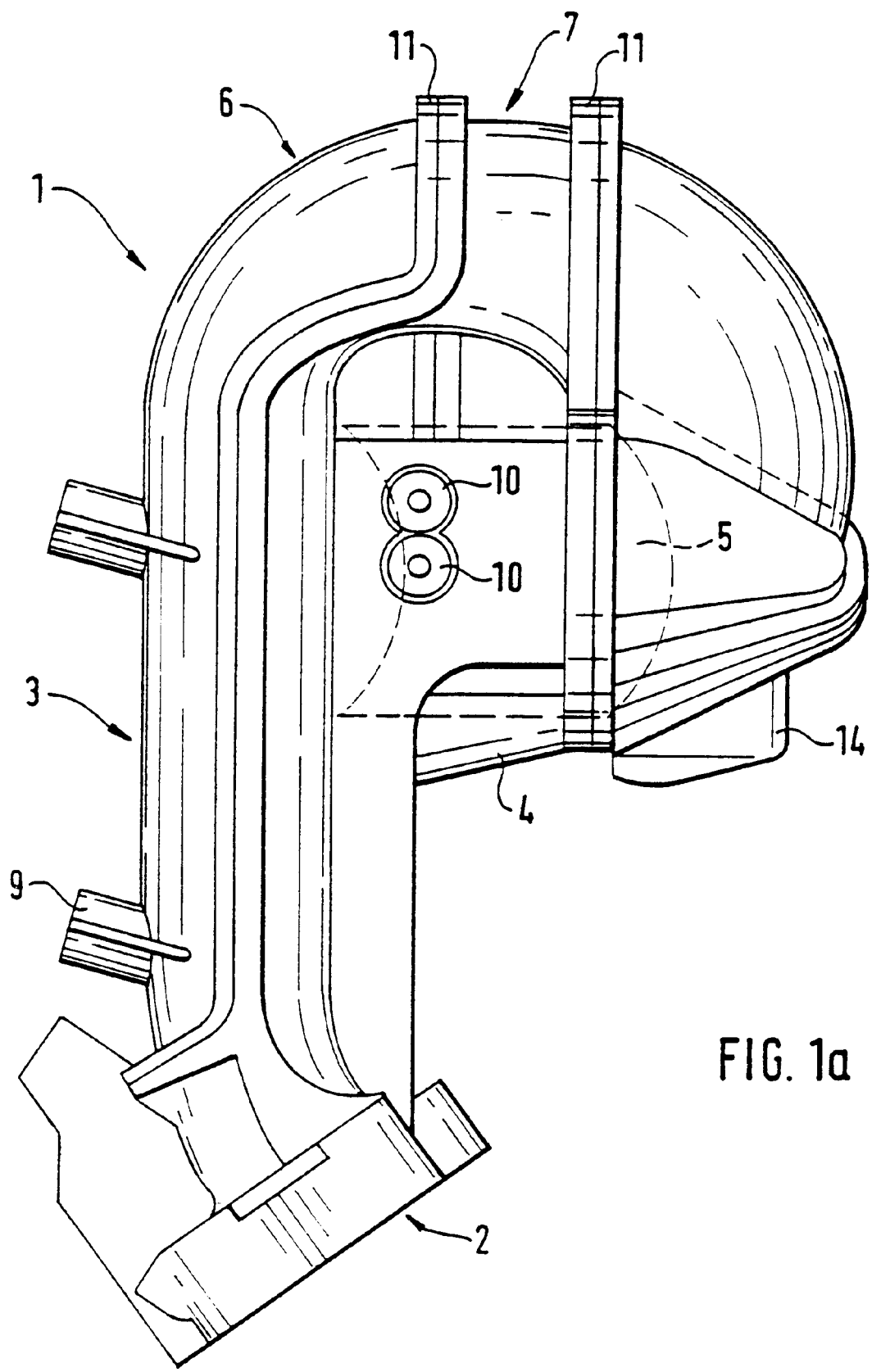

The intake manifold 1, which in the embodiment described is made by the half-shell technique, has the weld seams 11, typical of this technique, which are seen in FIG. 1a and which join the half-shells 6 and 7 together. For the connection to the actual engine block, not shown here, the intake manifold 1 has a flange 2. The tube elements 3 all open into the manifold chamber 4 which is divided in half by a dividing element 5 represented schematically in FIG. 1. The intake manifold 1 is fastened by means of the mount 9 in the motor compartment of, for example, a passenger automobile. By means of the vacuum connections 10 attached to the intake manifold 1, the pressure conditions inside the intake manifold are detected and used, for example, for control purposes. In FIG. 1a can be seen also a connection for exhaust gas recirculation 14 on the intake manifold 1.

The intake manifold 1 shown in FIG. 1b has a flange 2 on the engine end by means of which the intake manifold is fastened to the engine block of an internal combustion engine. This engine flange 2 is connected to a manifold chamber 4 by tube elements 3, which in turn are composed in this embodiment of synthetic resin half-shell elements 6 and 7. The manifold chamber communicates in turn with the air filter, which is not shown. The spatial extent of this manifold chamber 4 is limited by a dividing element 5 and bounded by a housing wall 8. This dividing element 5 acts as a barrier against the propagation of vibration modes which depend upon the operating state of the internal combustion engine. The intake manifold 1 is secured in the engine compartment by means of mount 9. The intake manifold 1, which in the embodiment described is made by the half-shell technique, has, as seen in FIG. 1b, the weld seams 11 typical of this technique. On the intake manifold 1 injection valve sockets 12 are provided into which the injection valves, not shown, are inserted, as well as fastening holes 13 by which the intake manifold is fastened to the engine block.

Alternatively, the entire intake manifold can also be made by the lost wax technique, but for this a certain complexity of geometry is necessary, such as complicated internal contours, so that if the half-shell technique were to be used, several shell molds would be necessary, and consequently the lost wax technique would have advantages with respect to the cost situation of the manufacturing process.

Different embodiments of dividing elements 5 are shown in FIGS. 2a to 2e.

Figure 2A:
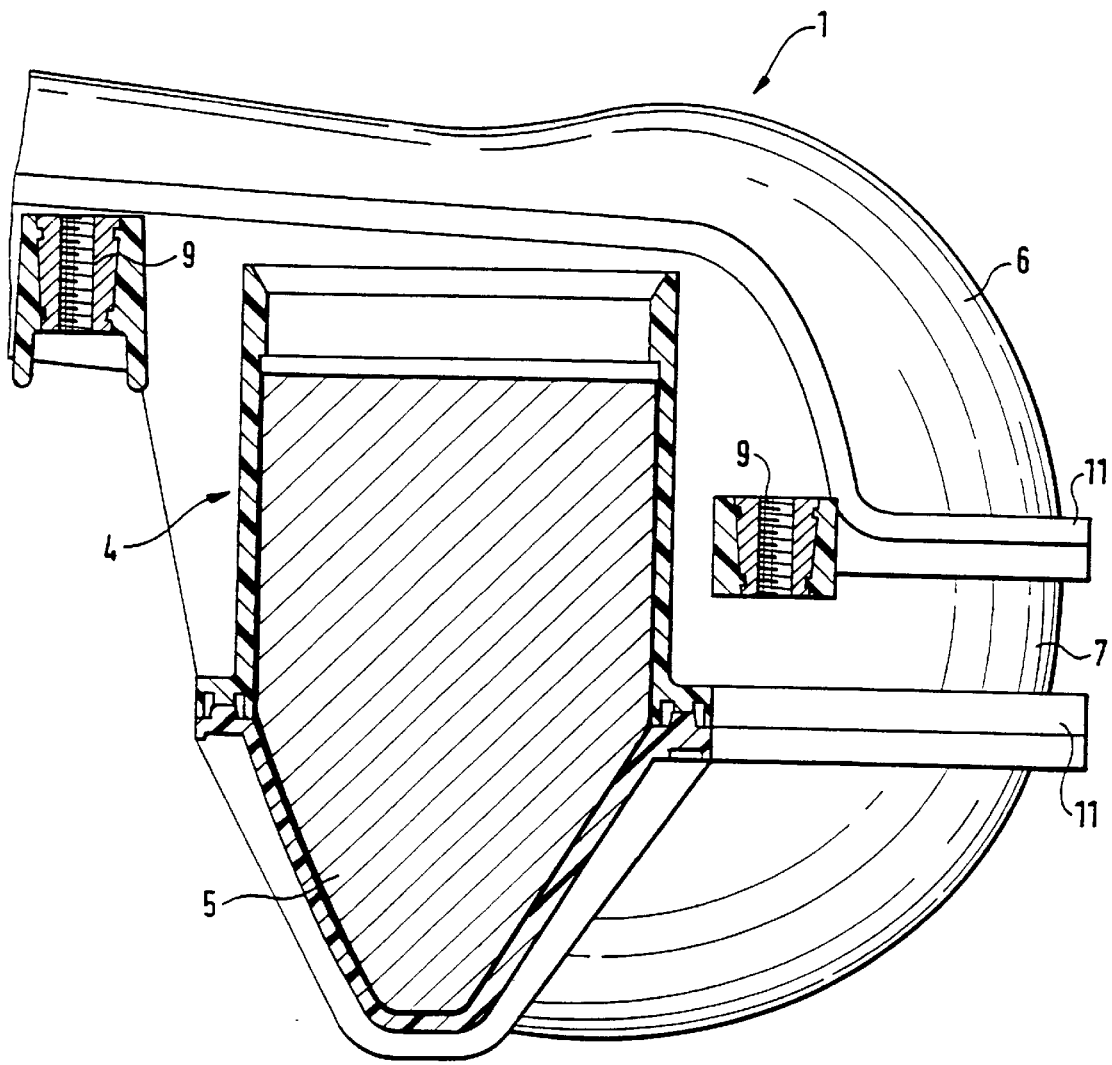
FIGS. 2a to 2e show embodiments of dividing elements.

In FIG. 2a the intake manifold illustrated in FIG. 1a is shown in section, whereby the dividing element 5 occupies nearly the entire cross sectional area of the manifold chamber 4. Also shown are the weld seams 11 which join the half-shell elements 6 and 7. The intake manifold is secured in the engine compartment by means of the mount 9.

Figure 2B:
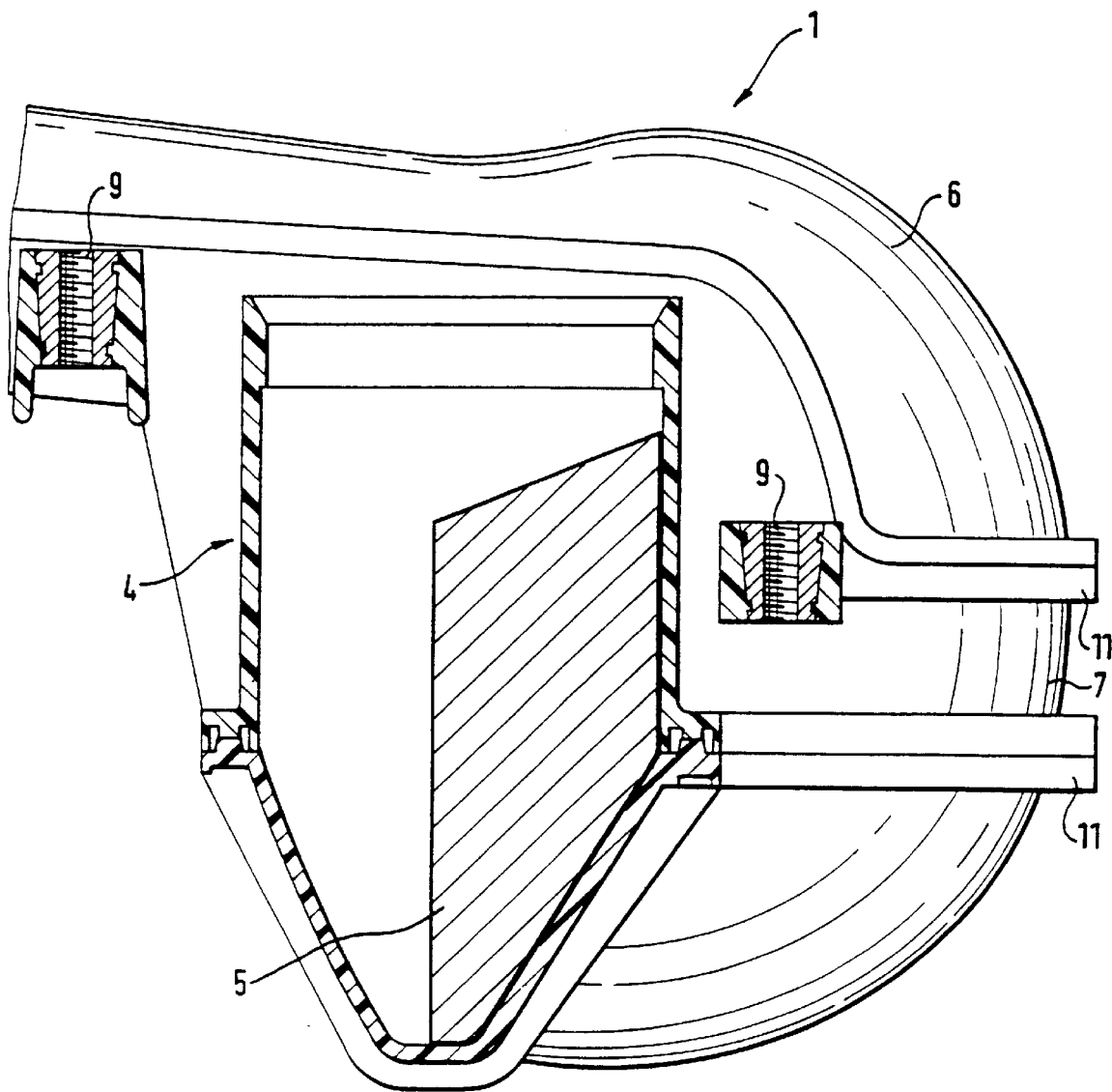

In FIG. 2b the intake manifold 1 illustrated in FIG. 1a is shown in section, whereby the dividing element 5 occupies only about one-quarter of the cross-sectional area of the manifold chamber 4. Also shown are the weld seams 11 which join the half-shell elements 6 and 7. The intake manifold is secured in the engine compartment by means of the mount 9.

Figure 2C:
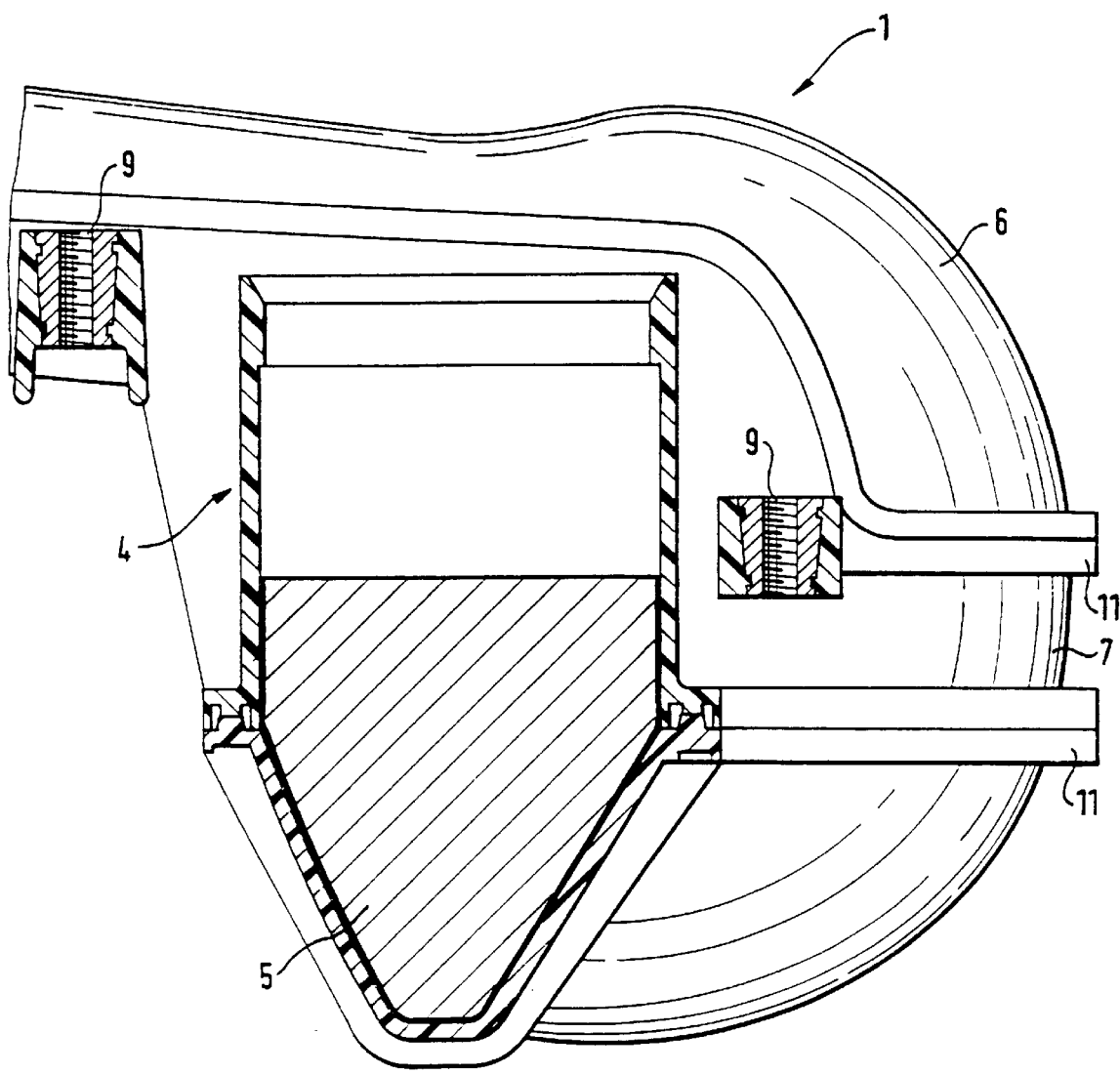

In FIG. 2c the intake manifold 1 illustrated in FIG. 1a is shown in section, whereby the dividing element 5 occupies only about one-half of the cross-sectional area of the manifold chamber 4. Also shown are the weld seams 11 which join the half-shell elements 6 and 7. The intake manifold is secured in the engine compartment by means of the mount 9.

Figure 2D:
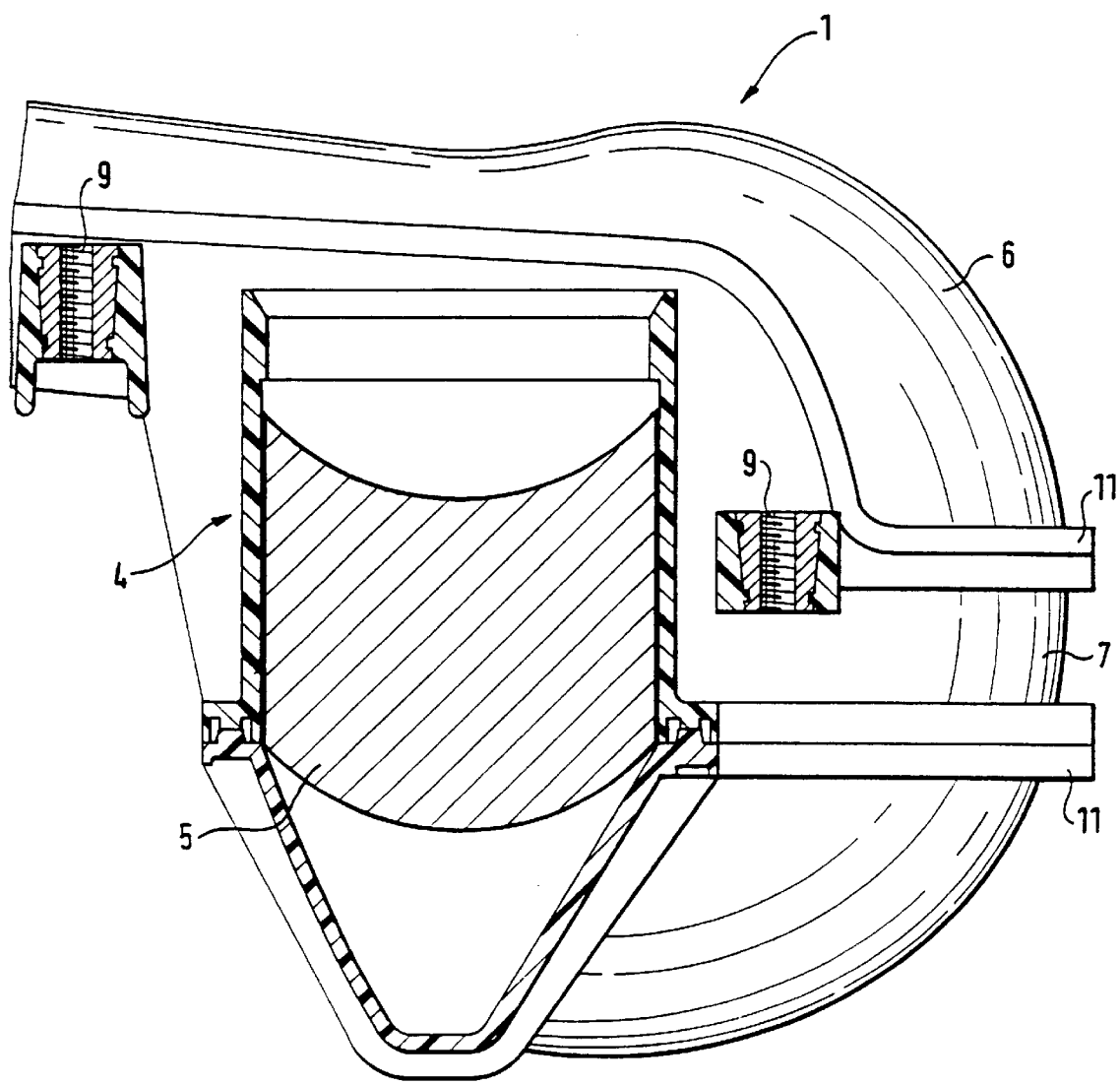

In FIG. 2d the intake manifold 1 illustrated in FIG. 1a is shown in section, the dividing element 5 occupying about one-third of the cross-sectional area of the manifold chamber 4. Also shown are the weld seams 11 which join the half-shell elements 6 and 7. The intake manifold is secured in the engine compartment by means of the mount 9.

Figure 2E:
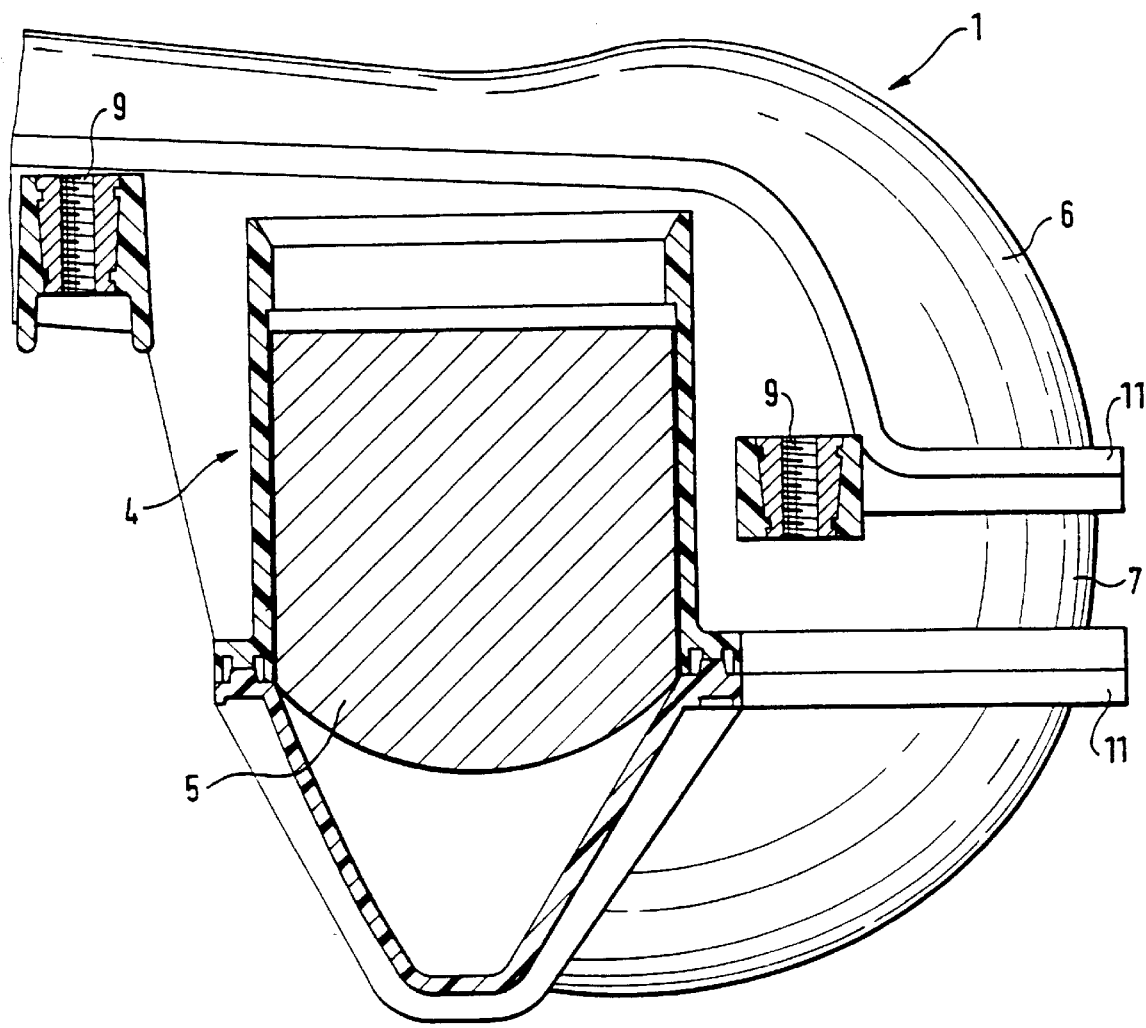

In FIG. 2e the intake manifold 1 represented in FIG. 1a is shown in section, whereby the dividing element 5 occupies about two-thirds of the cross-sectional area of the manifold chamber 4. Also shown are the weld seams 11 which join the half-shell elements 6 and 7. The intake manifold is secured in the engine compartment by means of the mount 9.

The dividing elements 5 shown in FIGS. 2b to 2e give a reduction of the noise emission of the intake manifold, even though the cross section of the manifold chamber 4 is reduced to only 25 to 75%. On the one hand this saves additional material, which corresponds to a weight reduction; on the other hand, the air behind the dividing element 5 acts like a damper on the air masses passing through the cross-sectional reduction caused by the dividing element 5. Another alternative is to be seen in the resilient mounting of dividing element 5, which leads to a further reduction of the noise emission of the intake manifold. Arranging the dividing element 5 in the manifold chamber 4 such that the distances from the housing wall 8 of the manifold chamber is not evenly divisible by the wavelength of the vibrations produced by the air flow or by an even multiple thereof, provides for a reduction of the noise emission of the intake manifold 1.

An additional alternative, which is not shown in the drawing, provides for the distance from the dividing element 5 to the housing wall 8 of the manifold chamber 4 to be adjustable. By the use either of elements which move the dividing wall 5 and are driven by electric motor or the support of dividing wall 5 by vacuum-driven elements, it becomes possible to adjust the dividing wall 5 to the ideal position with respect to the housing wall 8 of the manifold chamber depending on the respective operating state of the internal combustion engine.

What is claimed is:

1. An intake manifold for an internal combustion engine, said manifold comprising:

at least one flange for connection to a motor, at least two tube elements, at least one manifold chamber communicating with the at least two tube elements, and at least one dividing element which subdivides the manifold chamber into at least two communicating partial chambers, wherein said at least one dividing element comprises, at least partially, a porous material.

2. An intake manifold according to claim 1, wherein said intake manifold is formed of synthetic resin material.

3. An intake manifold according to claim 1, wherein said intake manifold is manufactured by the half-shell technique.

4. An intake manifold according to claim 1, wherein said dividing element occupies substantially 100% of the manifold chamber cross section.

5. An intake manifold according to claim 1, wherein said dividing element occupies from 25 to 75% of the manifold chamber cross section.

6. An intake manifold according to claim 1, wherein the dividing element is spaced from a manifold chamber inner wall a distance which is not evenly divisible by a wavelength occurring in a primary operating state of the engine or a multiple thereof.

7. An intake manifold according to claim 1, wherein said dividing element is adjustable in position to vary the distance from the dividing element to a manifold chamber inner wall.

8. An intake manifold according to claim 7, wherein the position of the dividing element is adjustable in dependence on the operating state of the internal combustion engine.

9. An intake manifold for an internal combustion engine, said manifold comprising:

at least one flange for connection to a motor, at least two tube elements, at least one manifold chamber communicating with the at least two tube elements, and at least one dividing element which subdivides the manifold chamber into at least two communicating partial chambers, wherein said dividing element occupies from 25 to 75% of a cross-section area of the manifold.

10. The intake manifold according to claim 9, wherein said intake manifold is formed of synthetic resin material.

11. The intake manifold according to claim 9, wherein said intake manifold is manufactured by the half-shell technique.

12. The intake manifold according to claim 9, wherein the dividing element is spaced from a manifold chamber inner wall a distance which is not evenly divisible by a wavelength occurring in a primary operating state of the engine or a multiple thereof.

13. The intake manifold according to claim 9, wherein said dividing element is adjustable in position to vary the distance from the dividing element to a manifold chamber inner wall.

14. The intake manifold according to claim 9, wherein the position of the dividing element is adjustable in dependence on the operating state of the internal combustion engine.

15. An intake manifold for an internal combustion engine, said manifold comprising:

at least one flange for connection to a motor, at least two tube elements, at least one manifold chamber communicating with the at least two tube elements, and at least one dividing element which subdivides the manifold chamber into at least two communicating partial chambers, wherein said at least one dividing element comprises, substantially in its entirety, a porous material.

* * * * *